United States Patent Office 2,793,727
Patented May 28, 1957

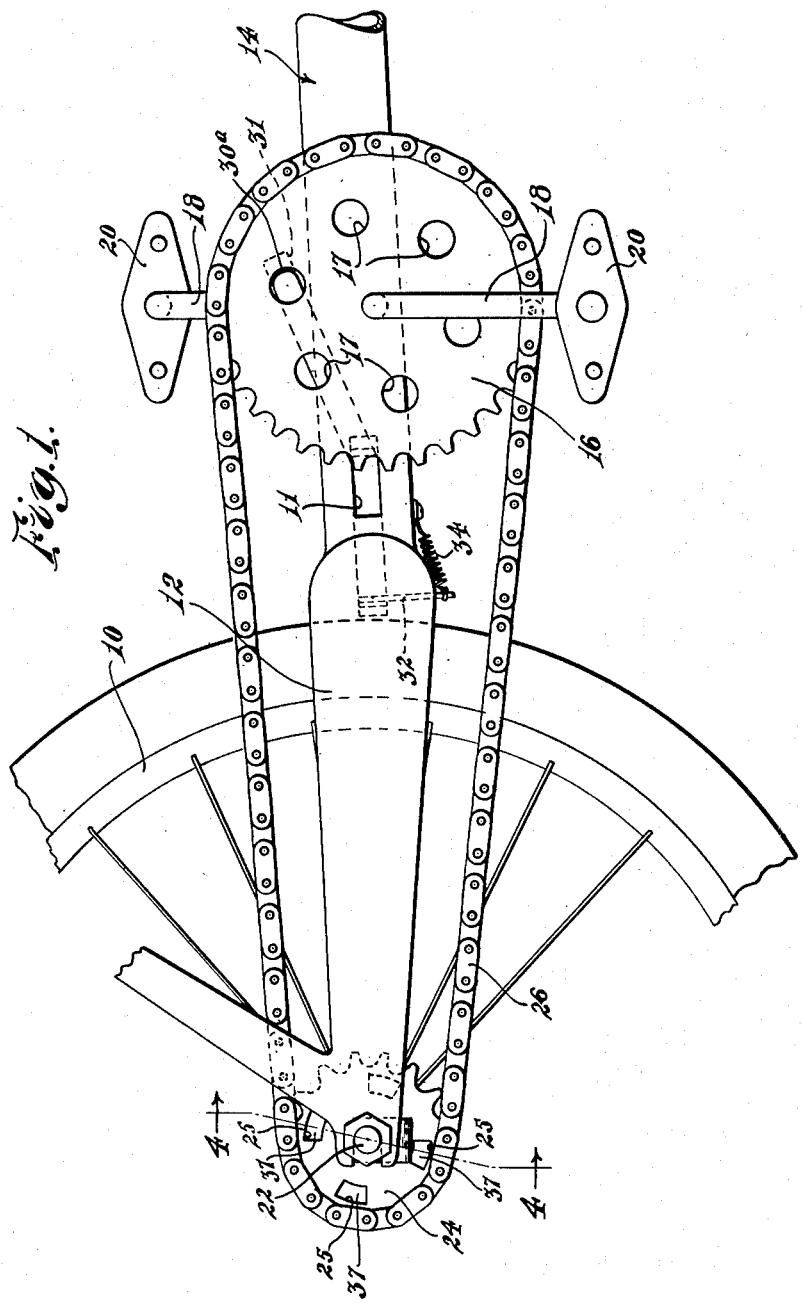

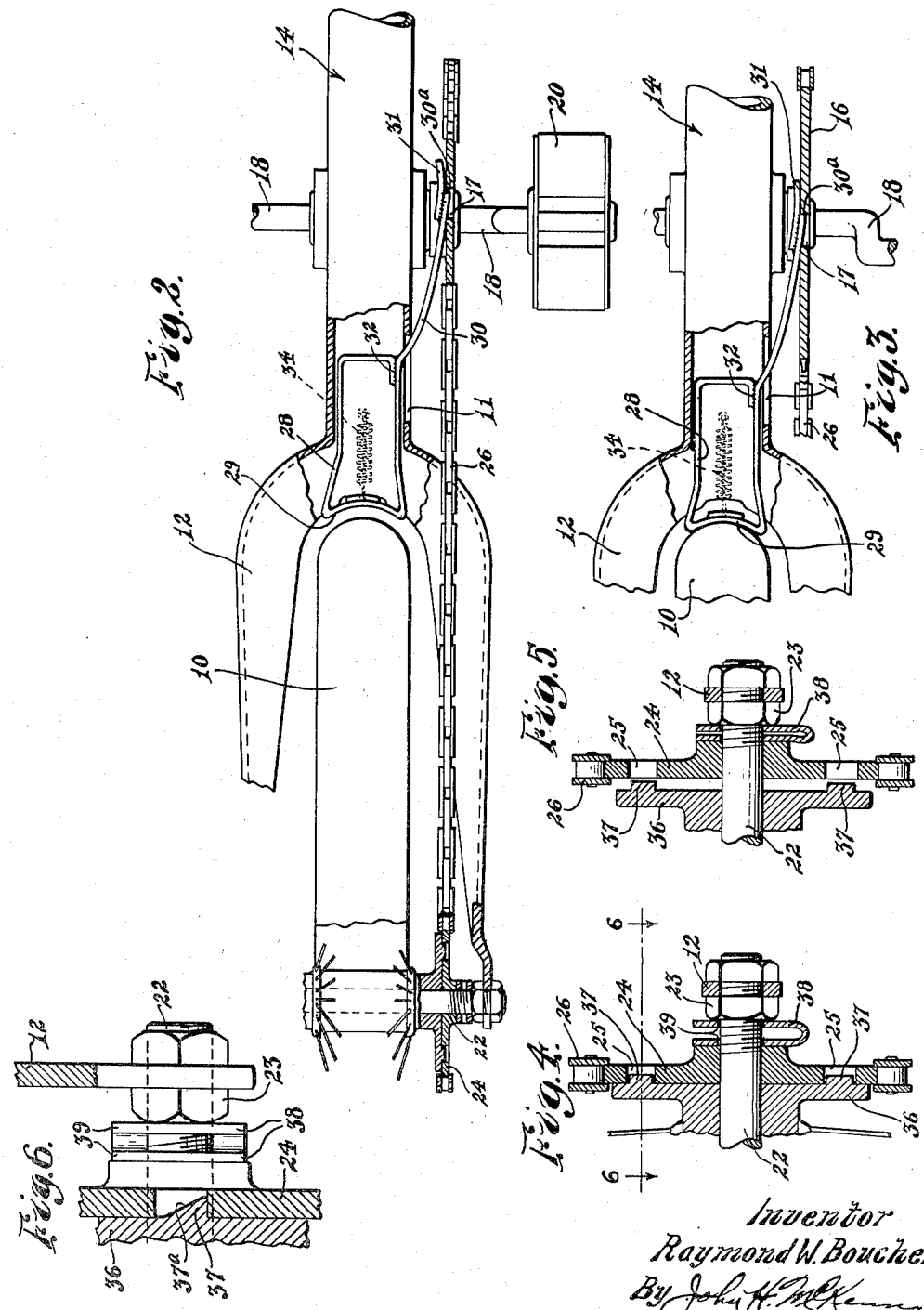

2,793,727

BACK PEDALING BRAKES

Raymond W. Boucher, Dothan, Ala., assignor to Hedstrom Union Company, Fitchburg, Mass., a corporation of Massachusetts Application June 7, 1955, Serial No. 513,670

4 Claims. (Cl. 192—5)

This invention relates to improvements in back pedaling brakes, and provides, more particularly, a simplified and relatively inexpensive back pedaling brake mechanism which is especially well suited for sidewalk bikes, and the like.

It is among the objects of the invention to provide a relatively simple and inexpensive back pedaling brake mechanism which is particularly suitable for the smaller varieties of bicycles, such as sidewalk bikes, and the like.

Another object of the invention is to provide a back pedaling brake structure which can effectively accomplish its purpose with a minimum of modification of more or less standardized bicycle parts and with relatively simple and inexpensive additions to the more or less standard mechanism of conventional non-backpedaling bicycles.

Yet another object of the invention is to provide a back pedaling braking structure wherein the braking action is simply and effectively accomplished by the conventional larger sprocket on the frame, in conjunction with a simultaneously acting spring-biased clutch at the rear wheel which automatically disables the rear wheel drive in response to any application of the brake.

It is, moreover, my purpose and object generally to improve the structure and effectiveness of back pedaling braking mechanisms, and more especially such mechanisms which can be produced relatively simply and inexpensively for sidewalk bikes, and the like.

In the accompanying drawings:

Fig. 1 is a fragmentary side elevation of rear portions of a sidewalk bike embodying features of the invention;

Fig. 2 is a top plan view of the portions of the bike shown in Fig. 1 with parts broken away and other parts in cross-section;

Fig. 3 is a view generally similar to Fig. 2 but showing the brake applied to the rear wheel;

Fig. 4 is a detail cross-sectional view approximately on line 4—4 of Fig. 1, on a larger scale;

Fig. 5 is a view similar to Fig. 4 but showing the rear wheel drive clutch disengaged; and Fig. 6 is a fragmentary cross-sectional view approximately on line 6—6 of Fig. 4, on a larger scale.

Referring to the drawings, the rear rubber-tired wheel 10 of a sidewalk bike, or the like, is mounted within the rear fork 12 of a conventional tubular frame indicated generally at 14. The larger sprocket 16, with the series of equally spaced holes 17 therein, is mounted in a conventional manner on frame 10, and conventional pedal arms and pedals are represented at 18 and 20 respectively. The rear wheel axle 22 has the smaller sprocket 24 thereon, and a conventional chain 26 is engaged around the sprockets 16, 24.

Referring more particularly to Figs. 2 and 3, the portion of tubular frame 14 which is fixed to the rear fork 12 is open through the U-bend of the fork, and a brake member 28 is slidably mounted in this portion of the frame and has a generally concave brake shoe portion 29 arranged and adapted to be moved into and out of braking engagement with the tire of wheel 10.

Preferably, the brake member is inexpensively formed of a single piece of suitably rigid strip metal bent into the generally rectangular form as shown, the initial metal strip being long enough to provide an actuating arm 30 for extending out through a slot 11 in the frame and into coacting relation with the sprocket 16 at the location of the series of sprocket holes 17. One end portion of the metal strip may be welded or otherwise secured at 32 to another portion of the strip within the hollow of the frame, adjacent to the slot 11, so that arm 30 extends out through the slot from the generally rectangular portion of the brake member 28. Arm 30 is appreciably flexed and has substantial resilience whereby its outer end portion is constantly biased toward engagement with the inner side of sprocket 16 at a location on the sprocket for snapping into successive ones of the holes 17 as the sprocket is rotated clockwise in Fig. 1. The outer end of arm 30 has a short extension member 31 fixed thereon for limiting the amount that the end of the arm can enter a hole 17, thereby to restrain the extreme end of the arm which provides a shoulder 30a for engaging the wall of a hole 17 when the sprocket 16 is rotated counter-clockwise as viewed in Fig. 1. Hence, as best seen in Figs. 2 and 3, any back pedaling rotation of sprocket 16 will result in the outer end of arm 30 entering a hole 17 with shoulder 30a engaged by the wall of the hole. Further back pedaling rotation of the sprocket 16 effects actuation of brake member 28 into braking coaction with wheel 10. The outer portion of brake member 28 has a depending part 32 thereon, and a coil spring 34 has one end connected to part 32 and its other end anchored on a fixed part of frame 14. The spring constantly biases the brake member 28 to its non-braking position of Fig. 2.

The described back pedaling braking actuation of brake member 28 requires disabling of the drive connection between the smaller sprocket 24 and rear wheel 10, which permits continued rotation of wheel 10 during the back pedaling process until the action of brake member 28 stops rotation of the wheel.

Referring more particularly to Figs. 2, 4 and 5, the wheel sprocket 24 constitutes one part of a clutch whose other part 36 is rigid on the hub of wheel 10. The wheel hub is rotatable on axle 22 in the conventional manner and any suitable bearing means may be employed between the axle and the wheel hub. Sprocket 24 also is rotatably mounted on axle 22 and is constantly biased toward engagement with clutch part 36 by the spring 38 which is under compression between the sprocket 24 and an axle nut 23. Sprocket 24 has a series of holes 25 therein equally spaced in a circle around its axle. Sprocket part 36 has a circular series of ratchet teeth 37 thereon adapted to engage within the sprocket holes 25 for wheel-driving coaction with the walls of said holes when the sprocket is rotated clockwise. The teeth 37 have cam surfaces 37a thereon and any clockwise rotation of clutch part 36 relative to sprocket 24 results in sprocket 24 being cammed axially away from clutch part 36 with spring 38 resiliently yielding and with teeth 37 riding idly on the sprocket 24. As shown spring 38 has generally U-shape and axle 22 extends loosely through holes 39 in the two arms of the U-spring.

It will be apparent from the foregoing description, in connection with the drawing, that any back pedaling action, when the bike is in forward motion, results in immediate relative rotation of the rear sprocket 24 and clutch part 36 with the clutch teeth riding idly on the sprocket 24 which will be cammed outward on axle 22 against the resilience of spring 38. Simultaneously, the back pedaling counter-clockwise rotation of the larger sprocket 16 causes brake member 28 to be applied to wheel 10 through the medium of brake actuating arm 30. Hence, the bicycle or bike can continue its forward motion notwithstanding the back pedaling until such time as the applied brake member 28 stops relative forward rotation of wheel 10.

Both the braking mechanism and the rear wheel clutch mechanism may be produced at relatively low cost commensurate with embodiment thereof in the smaller varieties of bicycles and, especially, sidewalk bikes.

It is intended that the patent shall cover, by suitable expression in the appended claims, whatever features of patentable novelty exist in the invention disclosed.

I claim as my invention:

1. In back pedaling braking mechanism for a wheeled vehicle having a tubular frame supporting two chain connected sprockets of which one is pedal actuated and the other chain-driven and connected for driving one of the wheels of the vehicle when said pedal-actuated sprocket is actuated in one direction, and having means for disabling the drive connection between said chain-driven sprocket and said one of the wheels in response to rotation of said one of the wheels in said one direction relative to said chain-driven sprocket, the combination therewith of a strip-form brake member slidably mounted within a portion of said tubular frame, means providing a wall opening in said frame portion, said brake member having a resilient arm extending out through said opening and biased into engagement with a face of said pedal-actuated sprocket, the latter said sprocket having a series of openings therein arranged around its axis and said arm having a portion arranged and adapted to ride idly on said face of the pedal-actuated sprocket and over said openings when said pedal-actuated sprocket rotates in said one direction, said portion of said arm having an abrupt shoulder thereon for being engaged by a wall of a said opening in response to rotation of said pedal-actuated sprocket in the opposite direction thereby to actuate said brake member into braking engagement with said one of the wheels substantially simultaneously with a said disabling of the drive connection between said wheel driving sprocket and said one of the wheels.

2. In back pedaling braking mechanism for wheeled vehicles having two chain connected sprockets of which one is pedal actuated and the other chain-driven and connected for driving one of the wheels of the vehicle when said pedal-actuated sprocket is actuated in one direction, and having means for disabling the drive connection between said chain-driven sprocket and said one of the wheels in response to rotation of said one of the wheels in said one direction relative to said chain-driven sprocket, a tubular frame member adjacent to the periphery of said one of the wheels, a brake member slidably mounted in said frame member and having a projecting brake shoe portion engageable with said one of the wheels, means defining a slot in the wall of said frame member, an actuating arm fixed to said brake member and extending out through said slot with an outer end portion there of resiliently biased into engagement with a face of said pedal-actuated sprocket, the latter said sprocket having a circular series of openings therein and said biased end portion of said arm being arranged and adapted to ride idly on said sprocket face and over said openings when said pedal-actuated sprocket is actuated in one direction, means providing an abrupt shoulder on said biased end portion of said arm, said shoulder being adapted to be engaged by a wall of a said sprocket opening when the pedal-actuated sprocket is actuated in the opposite direction thereby to actuate said brake shoe into braking engagement with said one of the wheels, and spring means constantly biasing said brake member in direction away from said wheel.

3. In a back pedaling braking mechanism, a tubular frame, a pedal-actuated sprocket rotatably mounted on a portion of said frame, said sprocket having openings therein arranged in a circle about the axis of the sprocket, a wheel rotatably mounted on said frame, drive connection between said sprocket and said wheel, a brake member slidably mounted in a tubular portion of said frame and having a brake shoe portion adjacent to the periphery of said wheel, means defining a slot in the wall of said tubular portion of the frame, an arm fixed to said brake member and extending out through said frame slot, said arm having an outer portion resiliently engaging a face of said sprocket and adapted to ride idly on said face and over said openings therein when said sprocket is pedal-actuated in one direction, an abutment on said engaging end portion of said arm adapted to be engaged by a wall of a said sprocket opening when said pedal-actuated sprocket is rotated in the opposite direction thereby to actuate said arm and said brake member generally toward said one of the wheels for braking said wheel.

4. In a back pedaling braking mechanism, a tubular frame, a pedal-actuated sprocket rotatably mounted on a portion of said frame, said sprocket having openings therein arranged in a circle about the axis of the sprocket, a wheel rotatably mounted on said frame, drive connection between said sprocket and said wheel, a strip metal brake member having generally rectangular form and including a brake shoe portion for braking engagement with the periphery of said one of the wheels, said brake member being slidably mounted in a tubular portion of said frame, means defining a slot in the wall of said tubular portion of the frame, and a strip metal extension on said brake member extending out through said slot and having an outer end portion resiliently engaging a face of said pedal-actuated sprocket at the location of said circle of openings, said resilient end portion of said extension providing an abutment which moves idly into and out of each said opening when the pedal-actuated sprocket rotates in one direction and which becomes engaged within a said opening by a wall of the opening when said pedal-actuated sprocket is rotated in the opposite direction thereby to effect wheel-braking actuation of said brake member and its shoe in response to further rotation of said pedal-actuated sprocket in said opposite direction.

References Cited in the file of this patent

UNITED STATES PATENTS

| 661,468 | Conrad | Nov. 6, 1900 |

FOREIGN PATENTS

| 81,594 | Germany | June 11, 1895 |
| 313,370 | Italy | Mar. 24, 1933 |
| 867,552 | France | Aug. 11, 1941 |